United States Patent
Zhao et al.

(10) Patent No.: US 9,655,068 B2
(45) Date of Patent: May 16, 2017

(54) OPTIMIZING TRANSMIT POWER IN UNIT EQUIPPED TO CONNECT TO FIRST AND SECOND NETWORK

(71) Applicant: APPLE INC., Cupertino, CA (US)

(72) Inventors: Yingjie Zhao, Pleasanton, CA (US); Li Su, San Jose, CA (US); Wanping Zhang, Cupertino, CA (US); Sreevalsan Vallath, Dublin, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/604,289

(22) Filed: Jan. 23, 2015

(65) Prior Publication Data

US 2016/0219527 A1    Jul. 28, 2016

(51) Int. Cl.
| | |
|---|---|
| *H04W 52/12* | (2009.01) |
| *H04W 52/40* | (2009.01) |
| *H04W 52/50* | (2009.01) |
| *H04W 52/24* | (2009.01) |

(52) U.S. Cl.
CPC ........... *H04W 52/50* (2013.01); *H04W 52/12* (2013.01); *H04W 52/242* (2013.01)

(58) Field of Classification Search
CPC . H04W 36/0055; H04W 36/18; H04W 52/12; H04W 52/267; H04W 52/346; H04W 52/40
USPC ............................................ 455/522; 370/331
See application file for complete search history.

(56) References Cited

U.S. PATENT DOCUMENTS

| | | | |
|---|---|---|---|
| 2013/0012215 A1* | 1/2013 | Seo ................... | H04W 36/0066 455/450 |
| 2015/0117407 A1* | 4/2015 | Hogan .................. | H04W 52/12 370/331 |

* cited by examiner

*Primary Examiner* — Philip Sobutka
(74) *Attorney, Agent, or Firm* — Fay Kaplun & Marcin, LLP (57) ABSTRACT

A user equipment and a method performed by the user equipment. The user equipment includes a transceiver configured to enable the user equipment to establish a connection with a first network and a second network, the first network configured to provide signals to control a transmit power of the transceiver and a processor configured to control the transmit power of the transceiver. The processor controls the transmit power by determining at least one network operation of the user equipment, the network operation associated with a configuration of the connection with the LTE network, receiving a signal from the LTE network indicating an increase in the transmit power to be used and performing a power operation that adjusts the transmit power of the transceiver less than the increase indicated in the signal.

20 Claims, 6 Drawing Sheets

OPTIMIZING TRANSMIT POWER IN UNIT EQUIPPED TO CONNECT TO FIRST AND SECOND NETWORK

BACKGROUND INFORMATION

A user equipment (UE) may be configured to establish a connection with a network. For example, the UE may be mobile device and utilize a wireless communications protocol. Based upon the capabilities of the hardware and software of the UE, the connection may be made with different types of networks. In a first example, the network may be a Long Term Evolution (LTE) network. In a second example, the network may be a Global System for Mobile Communications (GSM) network. When the UE is configured to establish a connection with multiple types of networks, the UE may establish a connection with a first network only to tune away (at least temporarily) to a second network. Subsequently, the UE may tune back to the first network. When a tune-away procedure is performed, a network component associated with the UE may draw various conclusions that are erroneous that may lead to increased transmit power, negatively impacted throughput, etc.

While connected to the different types of networks, the network component associated with the UE may transmit signals that control whether the UE is to increase or reduce the transmit power. When concerned with the network components' capability of decoding signals from the UE, the network component only transmits a transmit power control (TPC) up command that causes the UE to increase its transmit power. For example, during a tune away and tune back, the UE may experience conditions where the network component may not be capable of decoding signals at a predetermined level. However, this may cause the UE to maintain an increased transmit power level that overuses the limited power supply.

SUMMARY

In one exemplary embodiment, a user equipment is provided that includes a transceiver configured to enable the user equipment to establish a connection with a first network and a second network, the first network configured to provide signals to control a transmit power of the transceiver and a processor configured to control the transmit power of the transceiver. The processor controls the transmit power by determining at least one network operation of the user equipment, the network operation associated with a configuration of the connection with the LTE network, receiving a signal from the LTE network indicating an increase in the transmit power to be used and performing a power operation that adjusts the transmit power of the transceiver less than the increase indicated in the signal.

In another exemplary embodiment, a user equipment performs a method to control a transmit power of a transceiver, the transceiver configured to enable the user equipment to establish a connection with a first network and a second network, the first network configured to provide signals to control a transmit power of the transceiver. The method includes determining at least one network operation of the user equipment, the network operation associated with a configuration of the connection with the first network, receiving a signal from the first network indicating an increase in the transmit power to be used and performing a power operation that adjusts the transmit power of the transceiver less than the increase indicated in the signal.

In a further exemplary embodiment, a user equipment performs a method to control a transmit power of a transceiver, the transceiver configured to enable the user equipment to establish a connection with a Long Term Evolution (LTE) network and a further network. The method includes performing a tune-away procedure from the LTE network to the further network, performing a tune-back procedure from the further network to the LTE network, receiving a transmit power control (TPC) up command from the LTE network, preventing the TPC up command from being incorporated into a physical uplink shared channel (PUSCH) for a predetermined number of subframes and receiving an adjusted TPC up command from the LTE network, the adjusted TPC up command being a lesser increase in the transmit power than the TPC up command.

In a further exemplary embodiment, a user equipment performs a method to control a transmit power of a transceiver, the transceiver configured to enable the user equipment to establish a connection with a Long Term Evolution (LTE) network. The method includes performing an exchange of data blocks with the LTE network for at least a predetermined number of subframes, determining a block error rate (BLER) during the predetermined number of subframes, determining a signal-to-interference-plus-noise ratio (SINR) during the predetermined number of subframes and reducing the transmit power when the BLER is determined to be less than a predetermined threshold value and the SINR is determined to be greater than a further SINR associated with a modulation and coding scheme (MCS) assigned to the user equipment by the LTE network.

DETAILED DESCRIPTION

The exemplary embodiments may be further understood with reference to the following description and the related appended drawings, wherein like elements are provided with the same reference numerals. The exemplary embodiments are related to a system and method for optimizing a transmit power of a user equipment (UE). The UE may be configured to establish a connection with different types of networks such as a Long Term Evolution (LTE) network, a Global System for Mobile Communications (GSM) network, a CDMA network, etc. The UE may perform tune-away and tune-back procedures in view of this capability. The exemplary embodiments provide a mechanism to control the transmit power such that the network does not indicate that the UE is required to increase the transmit power to an unnecessarily high level or the UE determines that the transmit power may be decreased based upon network measurements.

Figure 1:
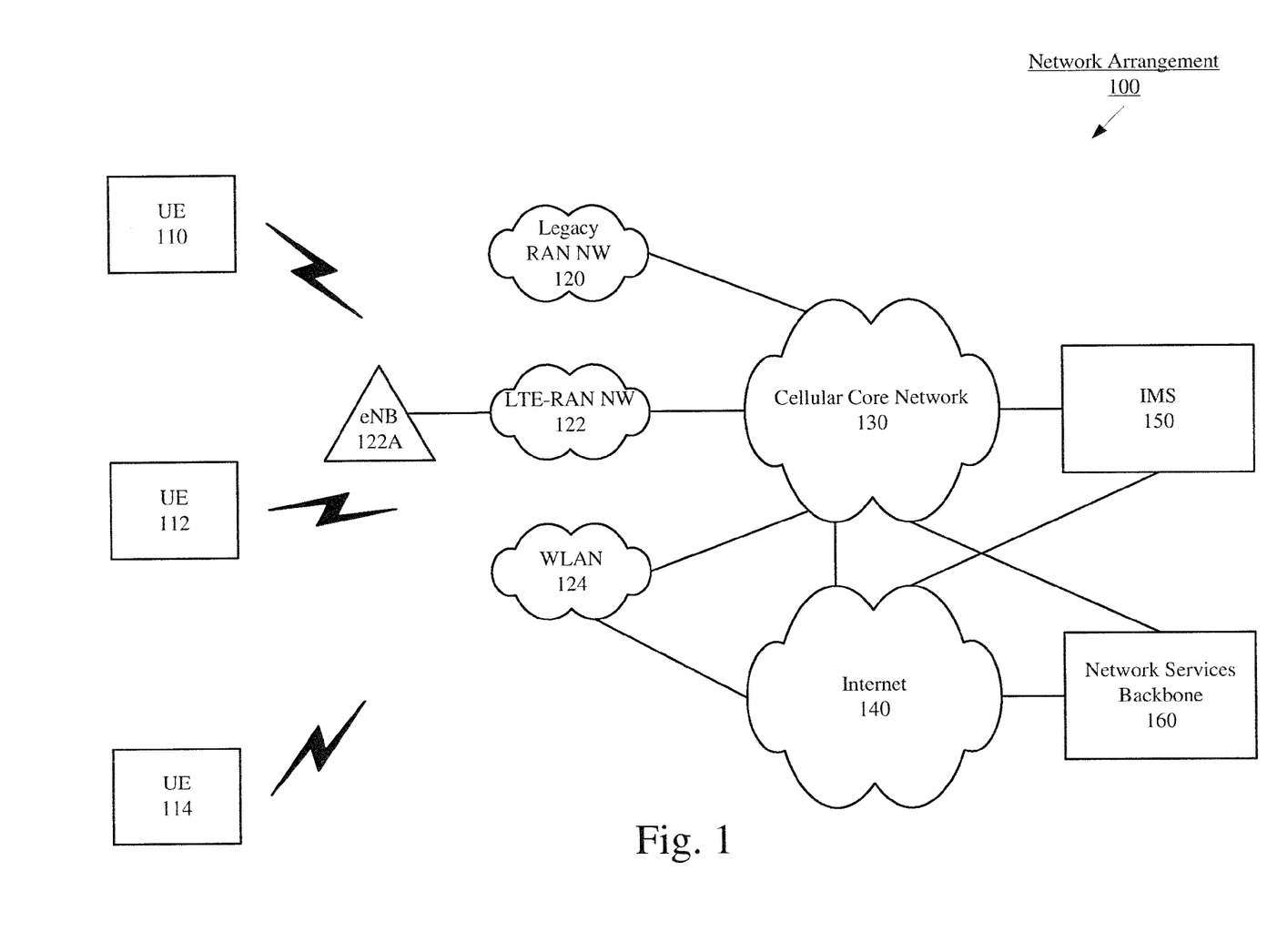
FIG. 1 shows an exemplary network arrangement.

FIG. 1 shows an exemplary network arrangement 100. The exemplary network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. More specifically, the legacy RAN 120 may be a GSM network utilizing, for example, a second generation (2G) digital cellular network. In this example, each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform Voice over LTE (VoLTE) calls with other UEs. For example, the UEs 110-114 may have a LTE chipset and communicate with the LTE-RAN 122. In another example, the UEs 110-114 may have a GSM chipmet and communicate with the legacy RAN 120 that is a GSM network. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 particularly using the GSM configuration may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the client devices 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 connecting to the legacy RAN 120 and the LTE-RAN 122 via an evolved Node B (eNB) 122A. Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122). Thus, the UEs 110-114 that are associated with the eNB 122A may utilize the CDRX functionality when configured to perform this feature. Subsequently, while associated with the eNB 122A and connected to the LTE-RAN 122, the UE may tune away to the legacy RAN 120 for a temporary amount of time to exchange data. The UE may then tune back to the LTE-RAN 122.

The tune-away procedure performed by the UE may entail communicating with the LTE-RAN 122 but occasionally tuning away from the LTE-RAN 122 to communicate with the legacy RAN 120. While the UE has data traffic with the LTE-RAN 122 (e.g., background traffic including control signals), the tune-away procedure may be performed such that the exchange of data with the LTE-RAN 122 is interrupted. For example, the UE may check for activity in the legacy RAN 120 during this tune-away procedure. In a specific embodiment, the activity may be pages or other messages not utilizing the LTE-RAN 122 but still requiring the legacy RAN 120.

From the UE perspective, the connection with the LTE-RAN 122 remains the same. That is, the temporary tuning away from the LTE-RAN 122 to the legacy RAN 120 does not have any impact on the connection. More specifically, upon the UE tuning back to the LTE-RAN 122, the UE expects a substantially similar connection with the LTE-RAN 122 as if the tune-away procedure was not even performed. With the knowledge of the tune-away procedure being performed, the UE therefore expects no change in service when tuning back to the LTE-RAN 122. However, from the network perspective of the base station (e.g., eNB 122A), since the tune-away procedure relates to an entirely different network, the eNB 122A is unaware that this procedure is occurring on the UE side. Therefore, the eNB 122A registers that the connection with the UE has been interrupted. Specifically, the eNB 122A may assume that the UE is experiencing fading such as fast fading due to the abrupt interruption in service. In wireless communications, fading is a change in attenuation that affects a signal over propagation media. Ordinarily, fading may relate to causes such as multipath propagation (i.e., multipath induced fading), shadowing from obstacles affecting the wave propagation (i.e., shadow fading), etc. That is, the causes for fading relate to physical conditions that may affect the manner in which transmissions are propagated from the UE to the LTE-RAN 122. However, with respect to the tune-away procedure, the physical conditions of the UE are unchanged (assuming the UE does not move and the surrounding conditions do not change significantly). Nevertheless, the eNB 122A of the LTE-RAN 122 may incorrectly conclude that the UE is experiencing fading.

When the UE tunes away to the legacy RAN 120 and tunes back to the LTE-RAN 122, the UE may initially experience marginal coverage on the LTE-RAN 122. It should be noted that the UE may generally experience marginal coverage based upon the above noted physical conditions as well as the location of the UE relative to the eNB 122A. While in marginal coverage and with data traffic on the LTE-RAN 122, the UE may reach a power headroom (PHR) limit more quickly since the available transmission power starts at a lower value where the PHR defines a remaining amount of transmission power available for the UE. It should be noted that even though the UE does not experience marginal coverage, the data traffic with the LTE-RAN 122 may be sufficiently high that the PHR limit is still reached. When these circumstances exist, the LTE-RAN 122 may conclude that the UE may be incapable of properly transmitting signals to the LTE-RAN 122 in a manner that the eNB 122A can properly decode the signals. As such, the LTE-RAN 122 may reduce an uplink modulation and coding scheme (MCS) for the UE. Because the MCS defines a value for a possible number of streams, modulation type, and coding rate while connected with the eNB 122A, reducing the value for the MCS reduces the possible numbers for each of these parameters. Therefore, an uplink throughput of the UE is negatively impacted.

In view of the above, the result from the tune-away procedure may entail at least one of an incorrect conclusion of a deep fade and a reduction in the uplink MCS due to a PHR limit being reached. Accordingly, the UE may be set at an unnecessarily increased transmit power after tuning back to the LTE-RAN 122 from the legacy RAN 120. Furthermore, the UE may have a lower uplink throughput performance. These drawbacks may all be due to the network misunderstanding the gap from the tune-away procedure. Thus, as will be described in further detail below, the exemplary embodiments provide a mechanism used during a tune-away procedure that reduces the amount of increased transmit power thereby conserving power and improves an uplink throughput.

With regard to the transmission power and the control thereof, those skilled in the art will understand that the eNB 122A to which the UE is associated may transmit signals that increase or decrease the transmission power to be used by the UE. This is particularly the case when the power control mechanism utilized by the eNB 122A is a closed loop power control. The closed loop power control may have the capability of directly controlling the transmit power of the UE using the above noted power control command signals in a downlink control packet. This power control exercised by the eNB 122A may relate to compensating for effects such as a detected fading such as that described above. An increased transmit power at the UE may provide a higher signal power at the receiver of the eNB 122A which increases the signal-to-noise ratio (SNR) to reduce a bit error rate that enables a higher spectral efficiency and protect against fading (if present). However, the increased transmit power increases the overall power consumption of a limited power supply of the UE and may cause interference with other UEs in the system in the same frequency band.

In addition, when the eNB 122A selects the power control parameters, the eNB 122A sets it for all the UEs associated therewith and not to a singled out, dedicated UE. When considering the system, the eNB 122A may select the power control parameters to improve signal decoding on its end. However, when considering each individual UE, there may be room to reduce the transmit power. For example, the UE may have little to no interference from its current position and surrounding environment. Therefore, a relatively low transmit power may be used. However, the power control parameters set by the eNB 122A may force the UE to use a higher transmit power. The closed loop power control may also enable the eNB 122A to further increase the transmit power of the UE such as when a high uplink block error rate (BLER) is determined. When the eNB 122A does not determine a high uplink BLER, the eNB 122A may still not command the UE to reduce its transmit power since the UE is utilizing a transmit power that allows the eNB 122A to properly decode the signals. That is, the eNB 122A may use a more selfish approach in selecting the power control parameters.

When the UE is set to utilize a higher than necessary transmit power, a field log that tracks transmissions from the UE to the eNB 122A may indicate that the uplink retransmission rate is relatively low (e.g., less than 1%). Such a value indicates that the uplink transmission power is set too high for the UE and is over-shooting. Although the power control parameters may be set by the eNB 122A to reduce the interference factor, the high transmit power always utilizes more power than needed at the UE.

As discussed above, the eNB may also assign a value for the MCS to the UE based upon the various network parameters corresponding to the UE and/or based upon a selected MCS value for all associated UEs. The higher transmit power at the UE may result in a signal-to-interference-plus-noise ratio (SINR) margin at the eNB side to be higher than the assigned MCS. That is, the MCS value may be too low or the SINR may be too high for the given transmit power being used by the UE. Those skilled in the art will understand that the LTE-RAN 122 is often configured to set a difference in MCS to SINR to be zero for power control and not as a MCS related compensation.

In this regard, the high transmit power selected for the UE may result in various drawbacks. Accordingly, as will be described in further detail below, the exemplary embodiments provide a mechanism used when a high transmit power is being used based upon a BLER and/or SINR margin measured at the UE.

Figure 2:
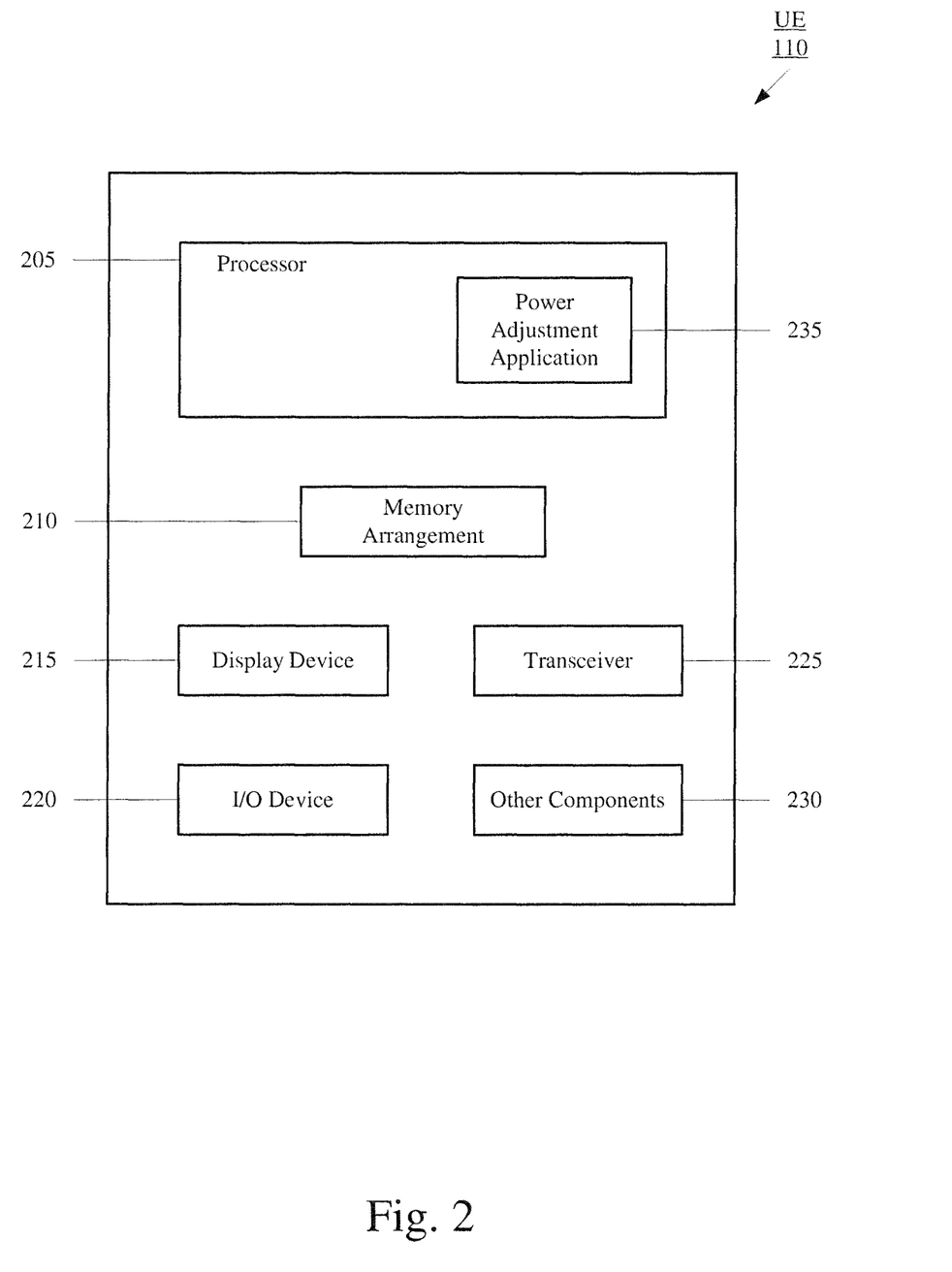
FIG. 2 shows an exemplary user equipment configured to optimize transmit power.

FIG. 2 shows the UE 110 of the network arrangement 100 of FIG. 1 that is configured to optimize transmit power. Specifically, the UE 110 is configured to execute a plurality of applications that perform predetermined functionalities to reduce a transmit power that would otherwise use more power than required for the LTE-RAN 122 to properly decode signals transmitted therefrom. For exemplary purposes, the UE 110 may also represent the UEs 112, 114. However, it should be noted that the other UEs 112, 114 may not necessarily be capable of performing the functionalities described below with regard to the UE 110.

The UE 110 may represent any electronic device that is configured to perform wireless functionalities and may be representative of one or more of the UEs 110-114. For example, the UE 110 may be a portable device such as a smartphone, a tablet, a phablet, a laptop, a wearable, etc. In another example, the UE 110 may be a client stationary device such as a desktop terminal. The UE 110 may be configured to perform cellular and/or WiFi functionalities. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a web browser when connected to a communication network via the transceiver 225. The use of the web browser may entail requesting uplink grants to transmit requests to the web browser or downlink grants to receive data from a website. In another example, the processor 305 may execute a Voice over LTE (VoLTE) call application. The VoLTE call application may also entail requesting uplink or downlink grants to exchange voice packages. Those skilled in the art will understand that these grants may be LTE data traffic performed while the UE 110 is connected to the LTE-RAN 122 via the eNB 122A. In yet another example, the processor 205 may execute a power adjustment application 235 to control the transmit power on the UE in a direct or indirect manner. As will be described in detail below, the power adjustment application 235 may passively control its transmit power using an indirect approach through exclusion of a power adjustment. The power adjustment application 235 may also actively control its transmit power using a direct approach when measured network parameters satisfy predetermined criteria.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 205 is split among two processors, a baseband processor and an applications processor. The exemplary embodiments may be implemented in any of these or other configurations of the UE.

The memory 210 may be a hardware component configured to store data related to operations performed by the UE 110. Specifically, the memory 210 may store data related to the power adjustment application 235. For example, the network parameters may be measured over a period of time and stored in the memory 210 for use by the power adjustment application 235. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and receive data with the eNB 122A. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). For example, the transceiver 225 may connect to the legacy RAN 120 using corresponding frequencies and also connect to the LTE-RAN 122 using corresponding frequencies. Thus, an antenna or multiple antennae (not shown) coupled with the transceiver 225 may enable the transceiver 225 to operate on these frequency bands.

As discussed above, the exemplary embodiments utilize the power adjustment application 235 to control the transmit power of the UE. Initially, it is noted that the power adjustment application 235 is configured to directly or indirectly control its own transmit power in a manner that does not run contrary to the power control command signals transmitted by the eNB 122A. That is, if the eNB 122A ultimately sets the transmit power for the UE at a certain value, the UE may be configured to set its transmit power at the indicated value.

In a first mechanism, the power adjustment application 235 may control the transmit power in an indirect manner. Specifically, the power adjustment application 235 may actively prevent a particular power adjustment that may be indicated when the UE 110 performs a tune-away procedure. As discussed above, the tune-away procedure may result in the LTE-RAN 122 mistakenly assuming that the UE 110 is experiencing a fade. When the UE 110 tunes back, the eNB 122A may transmit a signal to increase the transmit power due to this incorrect deduction of the fade. Specifically, the eNB 122A may transmit a transmit power control (TPC) up command that indicates to the UE 110 that the transmit power is to be increased despite the fade actually being an effect of the tune-away procedure. The UE 110 may instead ignore the TPC up command for a predetermined amount of time that allows the eNB 122A to re-calculate an amount of the TPC up command. In this manner, the UE 110 may not unnecessarily increase its transmit power to an unreasonable degree.

Figure 3:
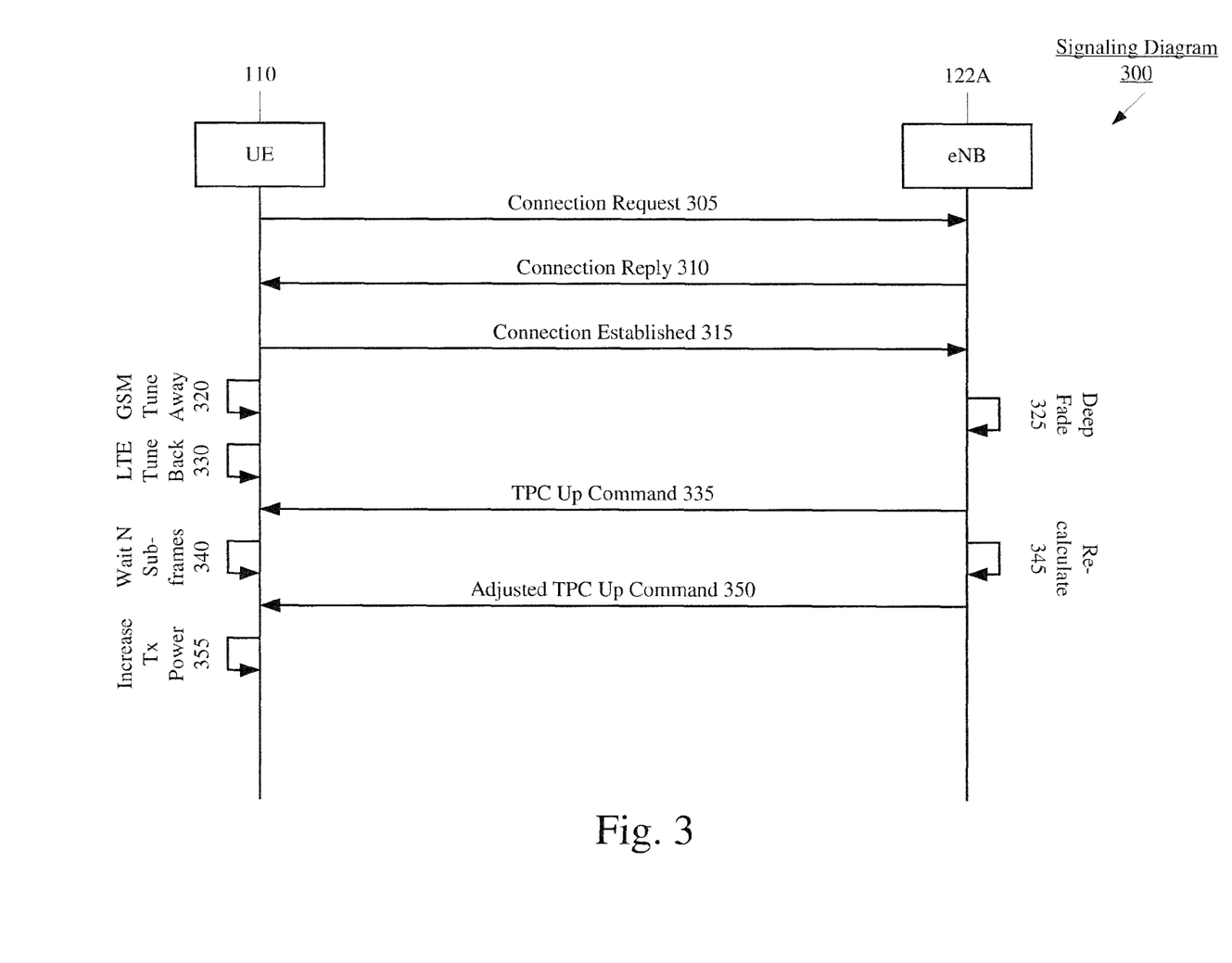
FIG. 3 shows an exemplary signaling diagram controlling a transmit power during a tune-away.

FIG. 3 shows a first exemplary signaling diagram 300 for controlling a transmit power during a tune-away procedure. Specifically, the signaling diagram 300 relates to when the UE 110 executes the power adjustment application 235 to perform the above described first mechanism. Accordingly, the signaling diagram 300 further relates to when the UE 110 performs a tune-away procedure to tune away from the LTE-RAN 122 to the legacy RAN 120 and tune back from the legacy RAN 120 to the LTE-RAN 122.

The signaling diagram 300 illustrates a generic procedure to first connect to the LTE-RAN 122 by the UE 110. Specifically, the UE 110 transmits a connection request 305 when the UE 110 is within an operating area of the eNB 122A and detects the presence of the LTE-RAN 122. The eNB 122A may transmit a connection reply 310 to the UE 110. Subsequently, a connection 315 may be established between the LTE-RAN 122 and the UE 110.

While connected to the LTE-RAN 122 and while there is LTE data traffic between the UE 110 and the eNB 122A, the UE 110 may perform a tune-away procedure 320 to the legacy RAN 120 such as a GSM network to check for activity. The tune-away procedure may be performed in a variety of manners such as periodically, aperiodically, upon request, etc. When the UE 110 tunes away from the LTE-RAN 122A, the eNB 122A may conclude that the UE 110 is experiencing a deep fade 325. When the UE 110 eventually tunes back 330 to the LTE-RAN 122, the eNB 122A may transmit a TPC up command 335. As described above, the TPC up command 335 may set the transmit power of the UE 110 using the closed loop power control. Using the basis of the deep fade 325, the TPC up command 335 may set the transmit power of the UE 110 too high.

The exemplary embodiments may be configured to utilize a predetermined number N of sub-frames that enable the eNB 122A to ensure that the LTE-RAN 122 has sufficient time to calculate a correct uplink air-link measurement to generate a proper TPC command that does not unnecessarily increase the transmit power of the UE 110 to an unreasonable level. Specifically, the power adjustment application 235 may be configured to control the exchange of signals with the eNB 122A for N sub-frames. That is, the power adjustment application 235 waits 340 the N sub-frames and omits the TPC up command 335 into a physical uplink shard channel (PUSCH) power calculation during these N sub-frames. The signals being exchanged between the UE 110 and the eNB 122A (not shown) may be the data traffic therebetween and used as a basis to generate the TPC command. Thus, during this exchange for the N sub-frames, the eNB 122A may have time to re-calculate 345 the TPC up command to transmit an adjusted TPC up command 350. Using this adjusted TPC up command 350, the UE 110 may increase 355 its transmit power.

Accordingly, the transmit power of the UE 110 is not increased to an unreasonable degree. The UE 110 has unlikely changed position significantly and the conditions of the environment have also unlikely changed significantly. Under an ideal scenario, the correct conclusion is that the UE 110 may continue utilizing the same transmit power prior to the tune-away procedure. However, due to the tune-away procedure and in consideration of timing (e.g., not requiring an infinite amount of time to reach the correct conclusion), the eNB 122A may re-calculate the TPC up command) to a more reasonable amount. In this manner, the transmit power of the UE 110 may be selected to conserve power on the UE. Furthermore, this first mechanism of the power adjustment application 235 may also improve uplink throughput in marginal coverage.

Figure 4:
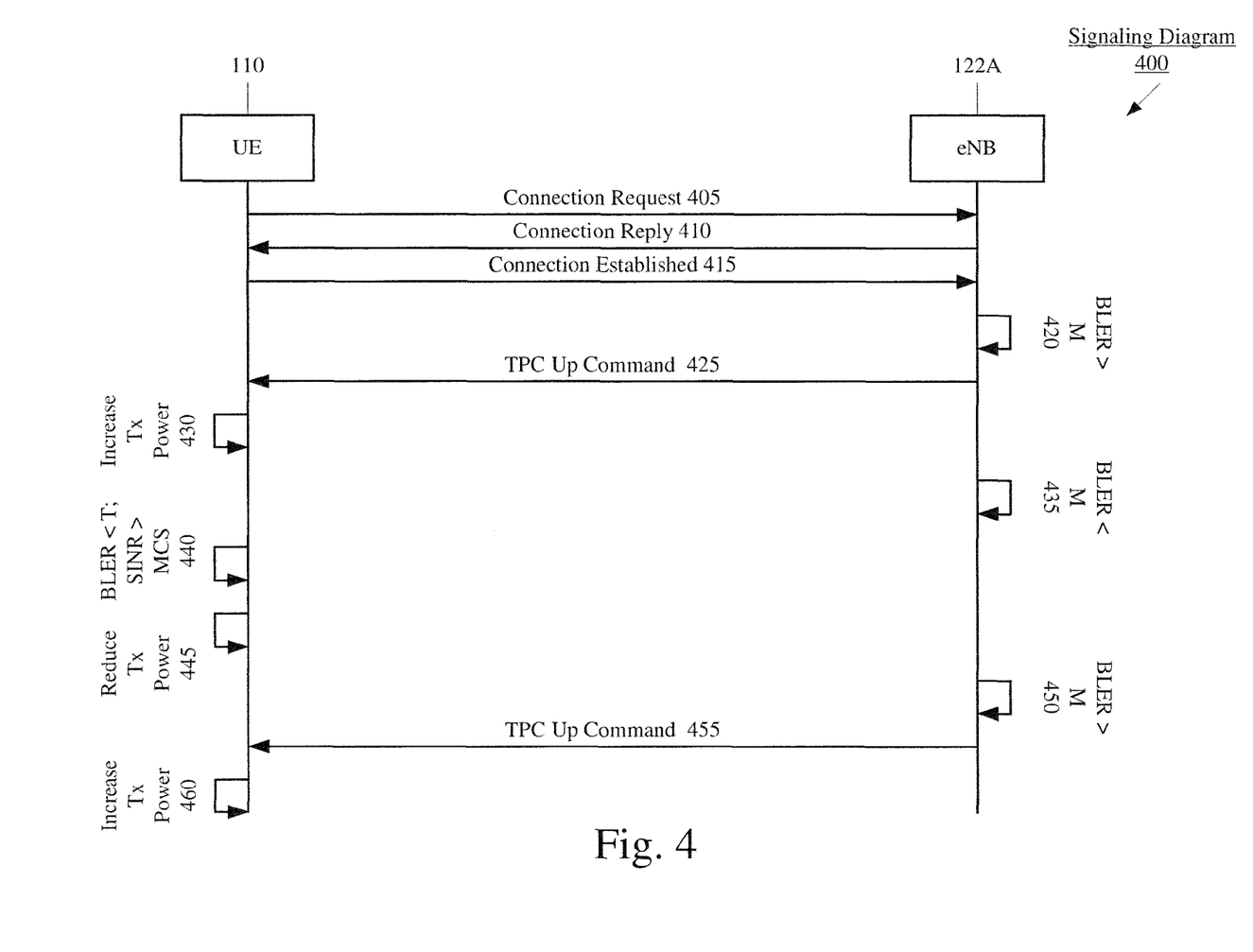
FIG. 4 shows an exemplary signaling diagram controlling a transmit power based upon network measurements.

FIG. 4 shows an exemplary signaling diagram 400 for controlling a transmit power based upon network measurements. Specifically, the signaling diagram 400 relates to when the UE 110 executes the power adjustment application 235 to perform the above-described second mechanism. Accordingly, the signaling diagram 400 further relates to when the UE 110 performs a procedure to measure network parameters to determine whether its current transmit power is set too high and reduce the transmit power on its own.

The signaling diagram 400 illustrates a generic procedure to first connect to the LTE-RAN 122 by the UE 110. Specifically, the UE 110 transmits a connection request 405 when the UE 110 is within an operating area of the eNB 122A and detects the presence of the LTE-RAN 122. The eNB 122A may transmit a connection reply 410 to the UE 110. Subsequently, a connection 415 may be established between the LTE-RAN 122 and the UE 110.

While connected to the LTE-RAN 122, the UE 110 may perform network measurements such as a BLER calculation and a SINR calculation. The BLER may define a ratio for a number of erroneous blocks to a total number of blocks. Thus, a low BLER may indicate that the transmissions of the data blocks has a higher success rate which may indirectly indicate that the transmit power is sufficiently high although there is no indication that the transmit power is too high. The SINR may define a ratio of a power of a signal to an interference power and noise power. Thus, a higher SINR may indicate that the power of the signal is high and may be sufficiently high for reception at a receiver which may also indirectly indicate that the transmit power is sufficiently high. The SINR may also be compared to a MCS value as these values correspond to one another such that a difference therebetween is ideally zero.

The exemplary embodiments may be configured for the power adjustment application 235 to measure the BLER and SINR values. The eNB 122A may also measure these values or receive these values from the UE 110 (e.g., based upon signals exchanged therebetween while the UE 110 is connected to the eNB 122A). Thus, the eNB 122A may determine that the BLER is above 420 a predetermined threshold M. The predetermined threshold M may be a value in which the erroneous blocks are sufficiently high that a higher transmit power is required. Thus, the eNB 122A transmits a TPC up command 425. This illustrates a first example that the power adjustment application 235 does not supercede the commands of the LTE-RAN 122. Thus, the UE 110 increases 430 the transmit power.

At a subsequent time, the eNB 122A may determine that the BLER is less 435 than the predetermined threshold M. As described above, the closed loop power control may allow the eNB 122A to utilize a selfish approach to ensure that the transmit power of the UE 110 is maintained to retain the capability of decoding signals from the UE 110. Thus, the eNB 122A may not transmit a TPC down command when this determination is made.

The power adjustment application 235 of the exemplary embodiments may utilize the network parameter information to make its own judgments to decrease the transmit power of the UE 110. As shown, the UE 110 may determine 440 that the BLER is less than a predetermined threshold T different from the predetermined threshold M. The predetermined threshold T may be a BLER value over a predetermined time in which the erroneous blocks are sufficiently low such that the parameters such as the retransmission rate is also sufficiently low. The determination 440 may also show that the SINR value is greater than a SINR value associated with the MCS that has been assigned to the UE 110 by the eNB 122. Again, an ideal comparison has a difference of zero for these values. Thus, the power adjustment application 235 may determine that these criteria have been satisfied such that the power adjustment application 235 reduces 445 the transmit power.

The reduced transmit power may be used until a subsequent time when the eNB 122A determines that the BLER has risen 450 beyond the predetermined threshold M. Again, this may represent another example that the power adjustment application 235 does not supercede the commands of the LTE-RAN 122. Thus, the UE 110 increases 460 the transmit power.

In a more specific example, the power adjustment application 235 may reduce the transmit power using the exemplary procedure. The eNB 122A may grant the MCS to the UE 110. The UE 110 may use any manner of getting out of a power adjust room of $P_{correction}$MAX. For example, the power adjustment application 235 may assume a current open loop power level MCS_26 and the UE 110 has room to reduce the power of $P_{correction}$MAX to $\Delta$TF26-$\Delta$TF_a. Whenever a radio resource control (RRC) is established, when a handover procedure is performed, or when the RRC is reconfigured, the $P_{correction}$ may be set to zero. The power adjustment application 235 may utilize four continuous uplink subframes as one power correction "super subframe." Thus, when the UE 110 transmits the super subframe (including subframe n, n+1, n+2, and n+3), an acknowledgement (ACK) is received at subframe n+4. If there is a transmission PUSCH and an ACK and if $P_{correction}$ is less than $P_{correction}$MAX, then the power adjustment application 235 may set $P_{correction}$+1. However, if there is even one negative acknowledgement (NACK) and if $P_{correction}$ is larger than zero, then the power adjustment application 235 may set $P_{correction}$-1. If there is no transmission at subframe m, the response (ACK/NACK) at subframe m+4 is not counted. Otherwise, the $P_{correction}$ may be set to $P_{correction}$. Accordingly, the $P_{correction}$ may be used for either $P0_{PUSCH}$ or Path_loss adjust (but not both). If the Path_loss is used, the new Path_loss may be set to a difference of measured_path_loss to $P_{correction}$. That is, the path loss is reduced and the transmit power is reduced per transmission power formula.

Figure 5:
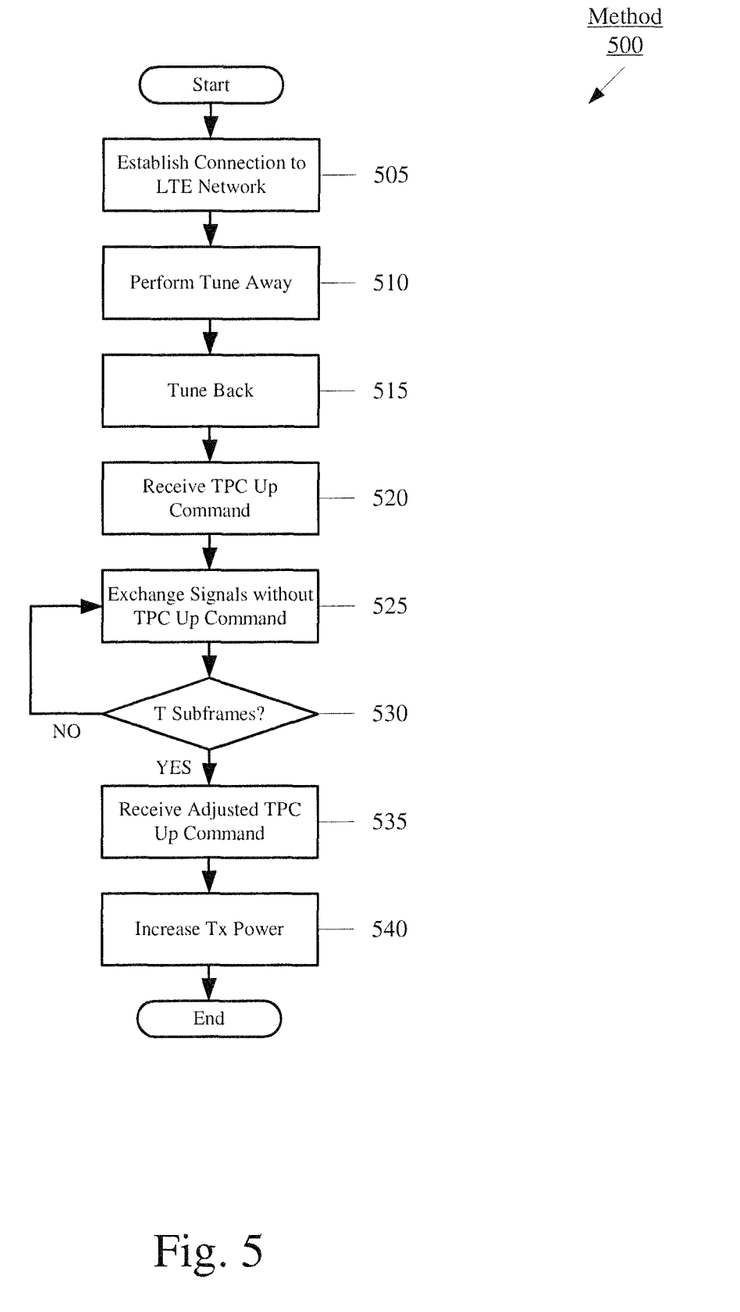
FIG. 5 shows an exemplary method for controlling a transmit power during a tune-away.

FIG. 5 shows an exemplary method 500 for controlling a transmit power during a tune-away. The method 500 relates to the first mechanism utilized when the UE 110 performs a tune-away procedure and the LTE-RAN 122 makes incorrect assumptions such as the UE 110 experiencing a fade and/or marginal coverage. The method 500 will be described with reference to the UE 110 performing the various functionalities. The method 500 will also be described with reference to the network arrangement 100 of FIG. 1, the UE 110 of FIG. 2, and the signaling diagram 300 of FIG. 3.

In step 505, the UE 110 establishes a connection with the LTE-RAN 122 via the eNB 122A. As discussed above, any association process may be used. While the UE 110 is connected to the LTE-RAN 122 with data traffic therebetween, in step 510, the UE 110 may perform a tune-away procedure. Because the UE 110 may be configured to establish a connection to different types of networks, the tune-away procedure may be performed such that the UE 110 tunes away from the LTE-RAN 122 to the legacy RAN 120 that may be a GSM network. The tune-away procedure may enable the UE 110 to check for activity on the legacy RAN 120 prior to tuning back. However, when the UE 110 tunes away from the LTE-RAN 122, the data traffic may be abruptly interrupted so that the LTE-RAN 122 may assume that the UE 110 has experienced a fade.

In step 515, the UE 110 tunes back from the legacy RAN 120 to the LTE-RAN 122. When the UE 110 tunes back, the data traffic with the LTE-RAN 122 may resume and signaling therebetween may continue. With the assumption of a fade, the LTE-RAN 122 may have prepared a TPC up command that indicates that the UE 110 is to increase its transmit power. Thus, in step 520, the TPC up command may be received.

In step 525, the power adjustment application 235 enables the exchange of signals between the UE 110 and the eNB 122A without the TPC up command being incorporated. That is, the PUSCH does not include the TPC up command power calculation. The power adjustment application 235 may continue to omit the TPC up command power calculation for a predetermined number of subframes T. As described above, the T subframes may equate to a combined time that allows the eNB 122A sufficient time to properly determine the TPC up command to be used by the UE 110. Thus, in step 530, the power adjustment application 235 determines whether T subframes have passed. If T subframes have not passed, the power adjustment application 235 returns the method 500 to step 525 until T subframes have passed.

Once T subframes have passed, in step 535, the UE 110 receives an adjusted TPC up command from the eNB 122A. The adjusted TPC up command may be a value that more reasonably increases the transmit power based upon the information that has been gathered by the eNB 122A regarding the capability of decoding signals from the UE 110. Thus, in step 540, the UE 110 increases the transmit power based upon the adjusted TPC up command.

It should be noted that the use of an adjusted TPC up command is only exemplary. In another embodiment, the T subframes may provide sufficient time for the eNB 122A to re-calculate the transmit power required for the UE 110 to be substantially similar or even lower than what was used prior to the tune-away procedure. In this manner, the eNB 122A may either omit any TPC command (when no change in transmit power is required) or transmit a TPC down command (when a lower transmit power may be used).

Figure 6:
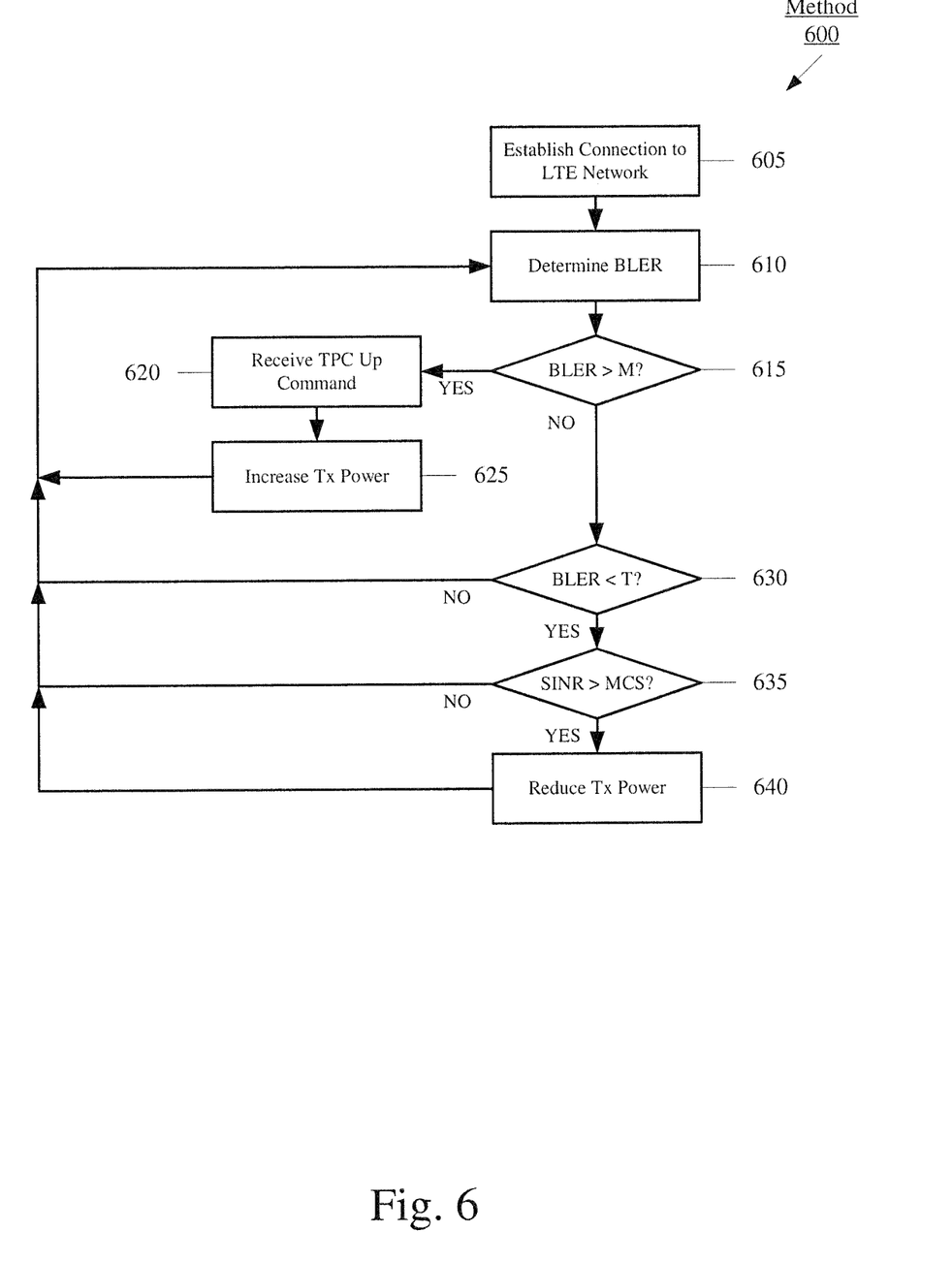
FIG. 6 shows an exemplary method for controlling a transmit power based upon network measurements.

FIG. 6 shows an exemplary method 600 for controlling a transmit power based upon network measurements. The method 600 relates to the second mechanism utilized when the UE 110 determines network measurements to determine whether the transmit power of the UE 110 is to be reduced without a TPC command from the eNB 122A. The method 500 will be described with reference to the UE 110 performing the various functionalities. The method 600 will also be described with reference to the network arrangement 100 of FIG. 1, the UE 110 of FIG. 2, and the signaling diagram 400 of FIG. 4.

In step 605, the UE 110 establishes a connection with the LTE-RAN 122 via the eNB 122A. As discussed above, any association process may be used. While the UE 110 is connected to the LTE-RAN 122, the UE 110 may continually monitor network parameters as well as results from transmissions. Thus, in step 610, the UE 110 determines a BLER based upon a previous number of subframes. Again, the BLER may be transmitted to the eNB 122A and/or the eNB 122A may determine the BLER for the UE 110.

In step 615, if the eNB 122A determines that the BLER is greater than a predetermined threshold M, the eNB 122A may transmit a TPC up command so that in step 625, the UE 110 increases its transmit power based thereupon. However, if the BLER is less than the predetermined threshold M, the eNB 122A may take no action and may even forgo a transmission of a TPC down command.

However, in step 630, the power adjustment application 235 may determine whether the BLER is less than a predetermined threshold T. The determination may be made for the BLER calculated for a preselected number of subframes. If the BLER is greater than the predetermined threshold T, the power adjustment application 235 returns the method 600 to step 610. However, if the BLER is less than the predetermined threshold T, the power adjustment application 235 continues the method 600 to step 635. Specifically, when the BLER is less than the predetermined threshold T, this may be indicative of the transmit power being too high. In step 635, the power adjustment application 235 may determine whether the SINR is greater than a SINR value associated with a currently assigned MCS. Again, the difference in these values is ideally zero. If the SINR value is greater than the SINR value associated with the MCS, the power adjustment application 235 returns the method 600 to step 610. However, if the SINR value is greater than the SINR value associated with the MCS, the power adjustment application 235 continues the method 600 to step 640. Specifically, when the SINR value is greater than the SINR value associated with the MCS, this may further be indicative of the transmit power being too high. Thus, in step 640, the UE 110 reduces the transmit power.

The exemplary embodiments provide a system and method of controlling a transmit power of a UE. In a first mechanism, the UE may be configured to establish a connection with a first network and have data traffic therebetween. Subsequently, a tune-away procedure may be performed with a second network that interrupts the data traffic with the first network. Upon tuning back to the first network, the UE may receive a TPC up command that instructs the transmit power of the UE to be increased. However, with the UE knowing that the tune-away procedure was performed while the first network is unaware, the UE may omit the TPC up command in signals exchanged with the first network for a predetermined amount of time until an adjusted TPC up command is received. In a second mechanism, the UE may be configured to determine network measurements. When the network measurements such as BLER and SINR satisfy certain criteria (e.g., BLER being lower than a predetermined threshold and SINR being greater than a SINR associated with a currently assigned MCS), the UE may select to reduce its transmit power as these criteria are indicative of the transmit power being too high.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A user equipment, comprising:
a transceiver configured to enable the user equipment to establish a connection with a first network and a second network, the first network configured to provide signals to control a transmit power of the transceiver; and
a processor configured to control the transmit power of the transceiver by:
determining at least one network operation of the user equipment, the network operation associated with a configuration of the connection with the first network;
receiving a signal from the first network indicating an increase in the transmit power to be used; and
performing a power operation that adjusts the transmit power of the transceiver less than the increase indicated in the signal.

2. The user equipment of claim 1, wherein the network operation is a tune-away procedure from the first network to the second network, the first network being a Long Term Evolution (LTE) network and the second network being a Global System for Mobile Communications (GSM) network.

3. The user equipment of claim 2, wherein the configuration of the connection with the tune-away procedure is an interruption of the connection with the LTE network.

4. The user equipment of claim 3, wherein the signal is a transmit power control (TPC) up command based upon the interruption of the connection of the user equipment with the LTE network.

5. The user equipment of claim 4, wherein the power operation includes:
preventing the increase that is non-zero from being incorporated with data transmissions being exchanged between the user equipment and the LTE network for a predetermined amount of time; and
receiving a further signal from the LTE network indicating an adjusted increase in the transmit power to be used, the adjusted increase being less than the increase.

6. The user equipment of claim 1, wherein the network operation is a calculation of network parameters.

7. The user equipment of claim 6, wherein the network parameters are a block error rate (BLER) and a signal-to-interference-plus-noise ratio (SINR).

8. The user equipment of claim 7, wherein the signal from the first network is an increase of zero in the transmit power.

9. The user equipment of claim 8, wherein the power operation includes:
determining the BLER is less than a predetermined threshold;
determining the SINR is greater than a further SINR associated with an assigned modulation and coding scheme (MCS) of the user equipment; and
reducing the transmit power.

10. The user equipment of claim 7, wherein the signal from the first network is a non-zero increase in the transmit power, the power operation includes:
increasing the transmit power.

11. A method comprising:
at a user equipment configured to control a transmit power of a transceiver, the transceiver configured to enable the user equipment to establish a connection with a first network and a second network, the first network configured to provide signals to control a transmit power of the transceiver:

determining at least one network operation of the user equipment, the network operation associated with a configuration of the connection with the first network;

receiving a signal from the first network indicating an increase in the transmit power to be used; and performing a power operation that adjusts the transmit power of the transceiver less than the increase indicated in the signal.

12. The method of claim 11, wherein the network operation is a tune-away procedure from the first network to the second network, the first network being a Long Term Evolution (LTE) network and the second network being a Global System for Mobile Communications (GSM) network, the configuration of the connection with the tune-away procedure is an interruption of the connection with the LTE network.

13. The method of claim 12, wherein the signal is a transmit power control (TPC) up command based upon the interruption of the connection of the user equipment with the LTE network.

14. The method of claim 13, wherein the power operation includes:

preventing the increase that is non-zero from being incorporated with data transmissions being exchanged between the user equipment and the LTE network for a predetermined amount of time; and receiving a further signal from the LTE network indicating an adjusted increase in the transmit power to be used, the adjusted increase being less than the increase.

15. The method of claim 11, wherein the network operation is a calculation of network parameters.

16. The method of claim 15, wherein the network parameters are a block error rate (BLER) and a signal-to-interference-plus-noise ratio (SINR).

17. The method of claim 16, wherein the signal from the first network is an increase of zero in the transmit power.

18. The method of claim 17, wherein the power operation includes:

determining the BLER is less than a predeteimined threshold;

determining the SINR is greater than a further SINR associated with an assigned modulation and coding scheme (MCS) of the user equipment; and reducing the transmit power.

19. A method, comprising:

at a user equipment configured to control a transmit power of a transceiver, the transceiver configured to enable the user equipment to establish a connection with a Long Term Evolution (LTE) network and a further network:

performing a tune-away procedure from the LTE network to the further network;

performing a tune-back procedure from the further network to the LTE network;

receiving a transmit power control (TPC) up command from the LTE network;

preventing the TPC up command from being incorporated into a physical uplink shared channel (PUSCH) for a predetermined number of subframes; and receiving an adjusted TPC up command from the LTE network, the adjusted TPC up command being a lesser increase in the transmit power than the TPC up command.

20. A method, comprising:

at a user equipment configured to control a transmit power of a transceiver, the transceiver configured to enable the user equipment to establish a connection with a Long Term Evolution (LTE) network:

performing an exchange of data blocks with the LTE network for at least a predetermined number of subframes;

determining a block error rate (BLER) during the predetermined number of subframes;

determining a signal-to-interference-plus-noise ratio (SINR) during the predetermined number of subframes; and reducing the transmit power when the BLER is determined to be less than a predetermined threshold value and the SINR is determined to be greater than a further SINR associated with a modulation and coding scheme (MCS) assigned to the user equipment by the LTE network.

* * * * *